March 2, 1948.  R. Y. GRANT, JR  2,437,024
WHISTLE
Filed Oct. 17, 1947

Inventor:
Robert Y. Grant, Jr.
By
Chas. R. Fay,
Attorney.

Patented Mar. 2, 1948

2,437,024

UNITED STATES PATENT OFFICE 2,437,024

WHISTLE

Robert Y. Grant, Jr., Townsend, Mass.

Application October 17, 1947, Serial No. 780,545

1 Claim. (Cl. 46—117)

This invention relates to a new and improved toy whistle and the principal object of the invention resides in the provision of a toy whistle in the form of a bird or the like having a hollow tail including a mouthpiece and a sharp edge opening, said hollow tail communicating with a hollow chamber adapted to be filled with water, said chamber rising through the body of the bird form and terminating at the head of the bird which has an open beak, to the end that when air or the breath is blown through the tail of the bird such air or breath will impinge on the water therein disturbing the same and causing variations in the air pressure or flow of air so as to produce a warble or trill rather than a continuous note.

Other objects and advantages of the invention will appear hereinafter.

Reference is to be had to the accompanying drawings in which

Figure 1:
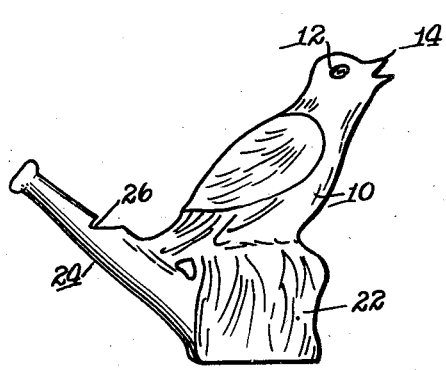
Fig. 1 is a view in side elevation of a device showing the invention.
Figure 2:
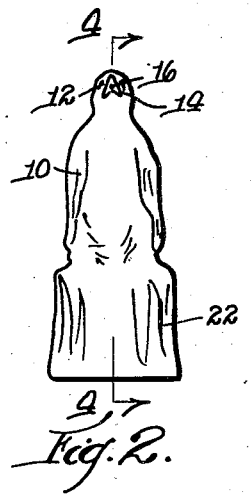
Fig. 2 is a view in front elevation.
Figure 3:
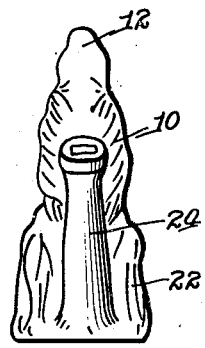
Fig. 3 is a view in rear elevation.
Figure 4:
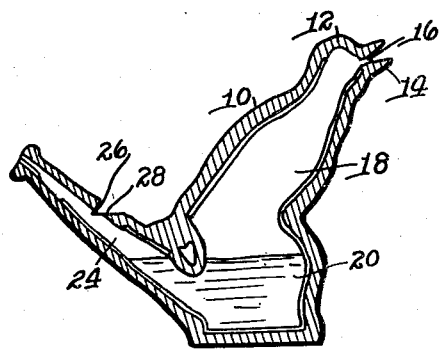
Fig. 4 is a section on line 4—4 of Fig. 2.

As shown in the drawing this invention comprises a whistle in the form of a bird having a hollow body 10, said body being provided with a head 12 and beak 14. There is an aperture 16 in the beak providing for the escape of air, this aperture, however, appearing in the article as in the mouth of the bird. The hollow body of the bird forms a chamber indicated at 18.

At the bottom of the chamber 18 there is provided another chamber in open communication therewith and adapted to be filled with liquid indicated at 20. This chamber is formed by a support on which the bird appears to be sitting and being in the form of a stump or the like indicated at 22.

The tail of the bird is considerably elongated and forms a hollow mouthpiece 24 provided with an opening 26 having a sharp edge 28 where the whistling sound is produced.

With liquid in the chamber as at 20, the breath or air is forced through the mouthpiece and directed into the liquid, which upon being thus disturbed, creates variations in air pressure so that as the whistle is produced at the sharp edge 28, such whistle will be in the form of a trill closely resembling the actual call of a bird rather than being a long continuous single note.

Having thus described my invention and the advantages thereof, I do not wish to be limited to the details herein disclosed otherwise than as set forth in the claim, but what I claim is:

A toy whistle comprising a hollow bird figure and a hollow support for said figure defining a liquid holding chamber, a tail on said figure, an angularly disposed tube extending directly into said hollow support with the lower wall of said tube terminating adjacent the bottom of said chamber, said tail merging with and being joined to said tube to support the tube in connection with said hollow support, said tube having an opening at a point above said support providing a sharp edge adjacent said opening, and a beak on said bird figure provided with a constricted hole, the interior of said hollow figure being in direct communication with said constricted hole.

ROBERT Y. GRANT, JR.

REFERENCES CITED

The following references are of record in the file of this patent:

UNITED STATES PATENTS

| Number | Name | Date |
|---|---|---|
| 1,154,672 | Tikijian | Sept. 28, 1915 |
| 1,504,186 | Evans et al. | Aug. 5, 1924 |